(12) United States Patent
Dittmar

(10) Patent No.: US 11,746,828 B2
(45) Date of Patent: Sep. 5, 2023

(54) TRANSPORT SECURABLE AXIAL SEAL ASSEMBLY

(71) Applicant: AKTIEBOLAGET SKF, Gothenburg (SE)

(72) Inventor: Rico Dittmar, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/535,667

(22) Filed: Nov. 25, 2021

(65) Prior Publication Data

US 2023/0160434 A1    May 25, 2023

(51) Int. Cl.
| | |
|---|---|
| *F16C 33/78* | (2006.01) |
| *F16C 33/80* | (2006.01) |
| *F16J 15/3252* | (2016.01) |
| *F16J 15/02* | (2006.01) |

(52) U.S. Cl.
CPC ........ *F16C 33/7826* (2013.01); *F16C 33/805* (2013.01); *F16J 15/022* (2013.01); *F16J 15/3252* (2013.01)

(58) Field of Classification Search
CPC .... F16J 15/3252; F16J 15/022; F16C 33/805; F16C 33/7826
See application file for complete search history.

(56) References Cited

U.S. PATENT DOCUMENTS

| | | | | |
|---|---|---|---|---|
| 4,434,985 A | * | 3/1984 | Sonnerat | F16J 15/40 |
| | | | | 277/402 |
| 5,431,413 A | * | 7/1995 | Hajzler | F16C 33/7879 |
| | | | | 384/485 |
| 6,170,992 B1 | * | 1/2001 | Angelo | F16C 33/805 |
| | | | | 384/477 |
| 6,550,973 B2 | * | 4/2003 | Yeo | F16C 33/805 |
| | | | | 384/484 |
| 7,021,830 B2 | | 4/2006 | Takehara et al. | |
| 7,674,044 B2 | | 3/2010 | Matsui | |

(Continued)

FOREIGN PATENT DOCUMENTS

JP    2009197884 A  *  9/2009  .......... F16C 33/7879

OTHER PUBLICATIONS

Unpublished U.S. Appl. No. 17/373,941, filed Sep. 30, 2022.
Unpublished U.S. Appl. No. 17/373,954, filed Sep. 30, 2022.

*Primary Examiner* — Eugene G Byrd
(74) *Attorney, Agent, or Firm* — J-TEK LAW PLLC; Scott T. Wakeman; Mark A. Ussai

(57) ABSTRACT

An axial seal assembly includes an inner annular shield having an axial portion disposable about the shaft at a position adjacent to the bearing and a radial portion extending radially outwardly from the axial portion. An outer annular seal has an axial portion engageable with the outer member bore, a radial portion extending radially inwardly from the axial portion and on or more axial sealing lips engaged with the shield radial portion. The seal radial portion is spaced from the shield radial portion by a predetermined axial distance during use. The seal has at least one coupler section engageable with the shield radial portion or the shield axial portion when an axial spacing distance between the seal radial portion and the shield radial portion is less than the predetermined distance to retain the shield coupled with the seal when the seal assembly is separate from an outer member bore.

14 Claims, 10 Drawing Sheets

(56) References Cited

U.S. PATENT DOCUMENTS

| | | | |
|---|---|---|---|
| 8,016,294 B2 * | 9/2011 | Shibayama | F16C 33/7883 |
| | | | 277/572 |
| 8,267,591 B2 | 9/2012 | Baba et al. | |
| 8,356,942 B2 | 1/2013 | Torii et al. | |
| 8,366,324 B2 * | 2/2013 | Takimoto | F16J 15/3264 |
| | | | 384/484 |
| 8,905,645 B2 | 12/2014 | Komori et al. | |
| 8,979,385 B2 | 3/2015 | Haepp et al. | |
| 9,139,041 B2 | 9/2015 | Duch et al. | |
| 9,403,405 B2 | 8/2016 | Barberis et al. | |
| 9,534,636 B2 | 1/2017 | Takayama et al. | |
| 9,956,820 B2 | 5/2018 | Gulli et al. | |
| 10,119,571 B2 | 11/2018 | Seno et al. | |
| 10,233,973 B2 | 3/2019 | Wollert et al. | |
| 10,240,674 B2 | 3/2019 | Sakai et al. | |
| 10,385,922 B2 * | 8/2019 | Inoue | F16C 33/7823 |
| 10,605,369 B2 | 3/2020 | Kato | |
| 10,677,291 B2 | 6/2020 | Senda | |
| 10,900,524 B2 | 1/2021 | Seki et al. | |
| 11,067,130 B2 | 7/2021 | Kim et al. | |
| 11,420,467 B2 | 8/2022 | Barberis et al. | |
| 2005/0089254 A1 | 4/2005 | Takehara et al. | |
| 2006/0076737 A1 * | 4/2006 | Kobayashi | G01P 3/443 |
| | | | 277/317 |
| 2007/0081751 A1 | 4/2007 | Norimatsu et al. | |
| 2008/0292231 A1 | 11/2008 | Matsui | |
| 2009/0102134 A1 * | 4/2009 | Shibayama | G01P 3/487 |
| | | | 277/351 |
| 2009/0127796 A1 | 5/2009 | Kanzaki et al. | |
| 2009/0206553 A1 | 8/2009 | Kanzaki | |
| 2009/0322032 A1 | 12/2009 | Kanzaki | |
| 2010/0232734 A1 | 9/2010 | Torii et al. | |
| 2010/0247014 A1 | 9/2010 | Ohmori et al. | |
| 2013/0127119 A1 | 5/2013 | Haepp et al. | |
| 2014/0003753 A1 | 1/2014 | Haepp et al. | |
| 2014/0376848 A1 * | 12/2014 | Duch | F16C 33/768 |
| | | | 384/448 |
| 2015/0117805 A1 * | 4/2015 | Takayama | F16C 33/7883 |
| | | | 384/480 |
| 2016/0003302 A1 | 1/2016 | Seno et al. | |
| 2016/0091023 A1 | 3/2016 | Shiono et al. | |
| 2016/0221391 A1 | 8/2016 | Lim et al. | |
| 2016/0236509 A1 | 8/2016 | Gullì et al. | |
| 2018/0135700 A1 | 5/2018 | Senda | |
| 2020/0079150 A1 | 3/2020 | Barberis et al. | |
| 2020/0141448 A1 | 5/2020 | Kim et al. | |
| 2021/0254668 A1 | 8/2021 | Suzuki | |
| 2021/0355995 A1 | 11/2021 | Sugawara et al. | |
| 2022/0213931 A1 | 7/2022 | Seki | |

* cited by examiner

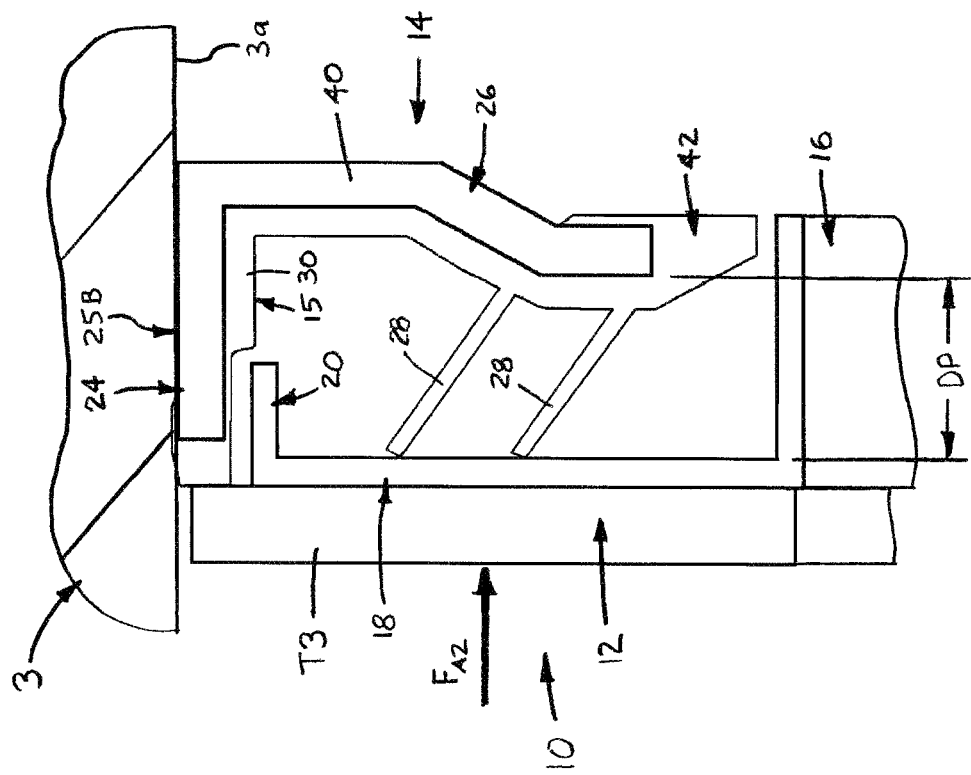
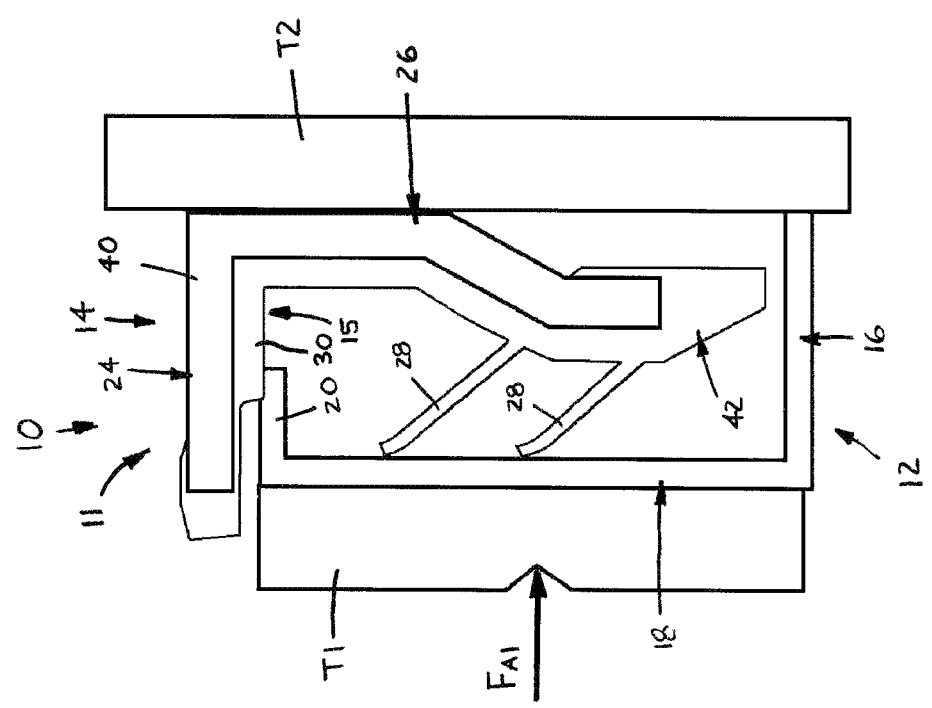

TRANSPORT SECURABLE AXIAL SEAL ASSEMBLY

BACKGROUND OF THE INVENTION

The present invention relates to seals, and more particularly to seals for wheel bearing assemblies.

Wheel bearing assemblies, particularly for mounting wheels to vehicles such as trucks, typically include an inner axle connected with a vehicle frame, an outer hub connectable to the wheel, and a bearing for rotatably coupling the hub with the axle. The bearings are often double-row tapered rollers disposed between the outer hub and the inner axle and enable the hub, and thereby the wheel, to rotate about a central axis extending through the fixed axle. As such bearings are generally exposed to contaminants such as brake dust, dirt, oil, metal shavings, etc., which may damage the bearings if contacting the rolling elements or the bearing raceway surfaces, one or more seals are provided adjacent to the raceways to exclude such contaminants. Such seal assemblies primarily function to retain lubricant, for example, oil, grease, etc., within the bearing.

SUMMARY OF THE INVENTION

In one aspect, the present invention is an axial seal assembly for sealing a bearing, the bearing coupling an inner shaft and an outer member, the outer member having an inner circumferential surface defining a bore and the shaft being disposed within the bore. The seal assembly comprises an inner annular shield having an axial portion disposable about the shaft at a position adjacent to the bearing and a radial portion extending radially outwardly from the axial portion. An outer annular seal has an axial portion engageable with the outer member bore and a radial portion extending radially inwardly from the axial portion, the seal including at least one axial sealing lip engaged with the radial portion of the annular shield. The seal radial portion is spaced from the shield radial portion by at least a predetermined axial distance during use of the seal assembly. The seal has at least one coupler section engageable with the radial portion of the shield or with the axial portion of the shield when an axial spacing distance between the seal radial portion and the shield radial portion is less than the predetermined distance so as to retain the shield coupled with the seal when the seal assembly is separate from the shaft and the outer member.

In another aspect, the present invention is again an axial seal assembly for sealing a bearing, the bearing coupling an inner shaft and an outer member, the outer member having an inner circumferential surface defining a bore and the shaft being disposed within the bore. The seal assembly comprises an inner annular shield having an axial portion disposeable about the shaft at a position adjacent to the bearing and a radial portion extending radially outwardly from the axial portion. An outer annular seal has an axial portion engageable with the outer member bore and a radial portion extending radially inwardly from the axial portion, the seal including at least one axial sealing lip engaged with the radial portion of the annular shield. The seal radial portion is spaced from the shield radial portion by at least a predetermined axial distance during use of the seal assembly. The seal has an outer shoulder engageable with the radial portion of the shield or an inner shoulder engageable with the axial portion of the shield when an axial spacing distance between the seal radial portion and the shield radial portion is less than the predetermined distance. As such, the shield is coupled with the seal when the seal assembly is separate from the shaft and the outer member.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 4 is an axial cross-sectional view of an upper portion of the first construction seal assembly shown during a coupling process;

FIG. 5 is an axial cross-sectional view of an upper portion of the first construction seal assembly shown during a final installation step;

DETAILED DESCRIPTION OF THE INVENTION

Figure 1:
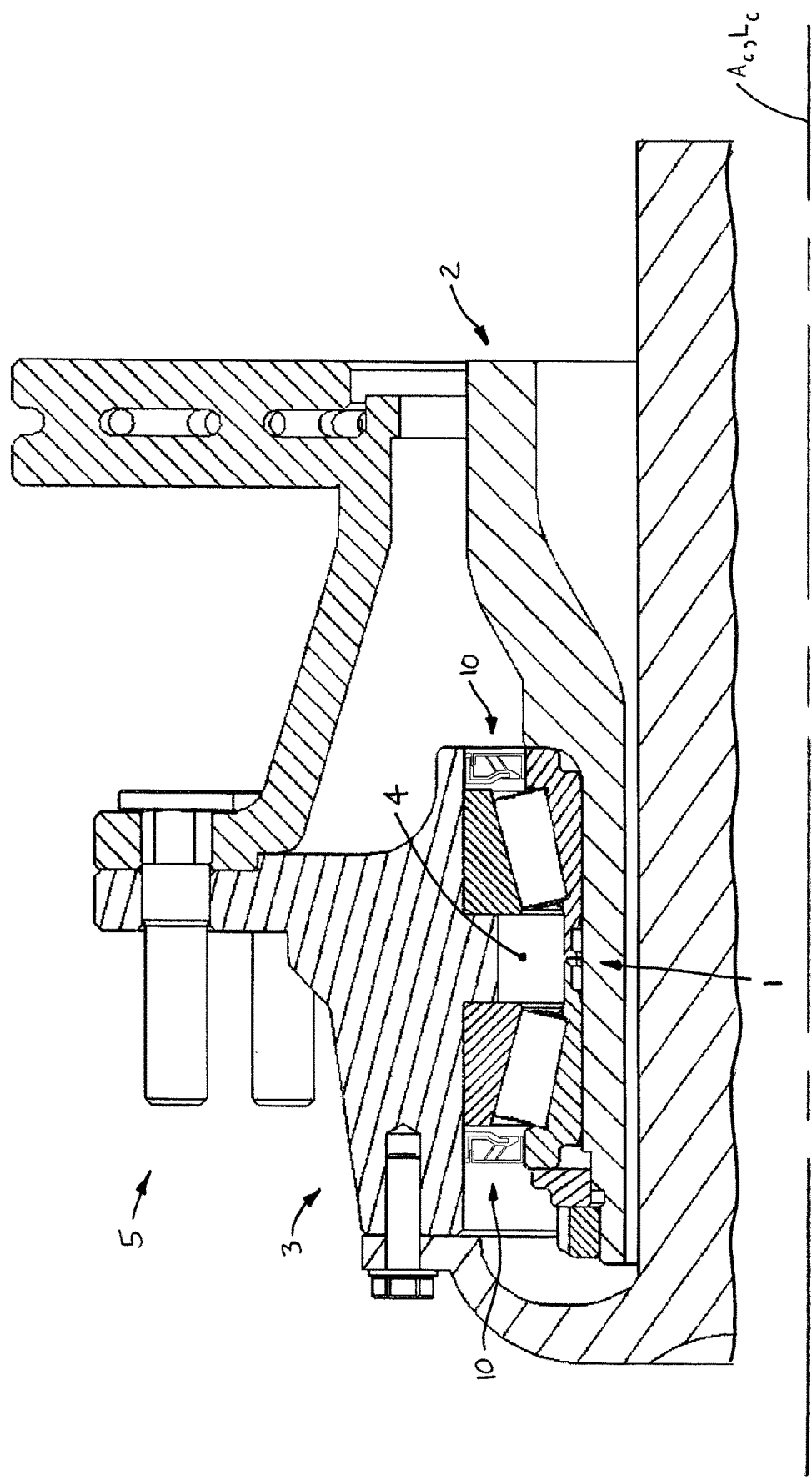
FIG. 1 is an axial cross-sectional view of an upper portion of a wheel bearing assembly including two seal assemblies in accordance with a first construction.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-13 an axial seal assembly 10 for sealing a bearing 1, the bearing 1 coupling an inner shaft 2 and an outer member 3. The outer member 3 has an inner circumferential surface 3a defining a bore 4 and the shaft 2 is disposed within the bore 4. Preferably, the outer member 3 is a hub and the bearing 1, the shaft 2 and the outer member/hub 3 form a wheel bearing assembly 5, most preferably for an electrically powered or "electric" truck, the outer member/hub 3 being rotatable about an axis Ac extending through the shaft 2 and configured to couple a wheel (not shown) with a vehicle (not shown). However, the seal assembly 10 may be used in any other appropriate application, such as to seal a bearing 1 for a pump, an electric motor, a turbine, a conveyor, etc. The seal assembly 10 has a centerline $L_C$ collinear with the axis Ac and basically comprises an inner annular shield 12 coupleable with the shaft 2 and an outer annular seal 14 disposed about the shield 12 and coupleable with the outer member 3, the seal 14 having at least one coupler section 15 coupleable with shield 12 to form a coupled-together seal unit 11 for transport and assembly.

More specifically, the inner annular shield 12 has an axial portion 16 disposable about the shaft 2 at a position adjacent to the bearing 1, as shown in FIG. 1, and a radial portion 18 extending radially outwardly from the axial portion 16. The shield axial portion 16 has first and second axial ends 16a, 16b and inner and outer circumferential surfaces 17A, 17B, the inner surface 17A preferably being frictionally engageable with an outer surface 2a of the shaft 2 to couple the shield 12 thereto. The shield radial portion 18 has inner and outer radial ends 18a, 18b, respectively, and opposing radial surfaces 19A, 19B, the inner radial end 18a being integrally formed with the first end 16a of the axial portion 16. In certain constructions shown in FIGS. 1-9, the shield 12 further includes a flange 20 extending axially from the outer end 18b of the radial portion 18 in direction generally toward the seal 12, as discussed below, the flange 20 having opposing axial ends 20a, 20b and inner and outer circumferential surfaces 21A, 21B, respectively.

Figure 6:
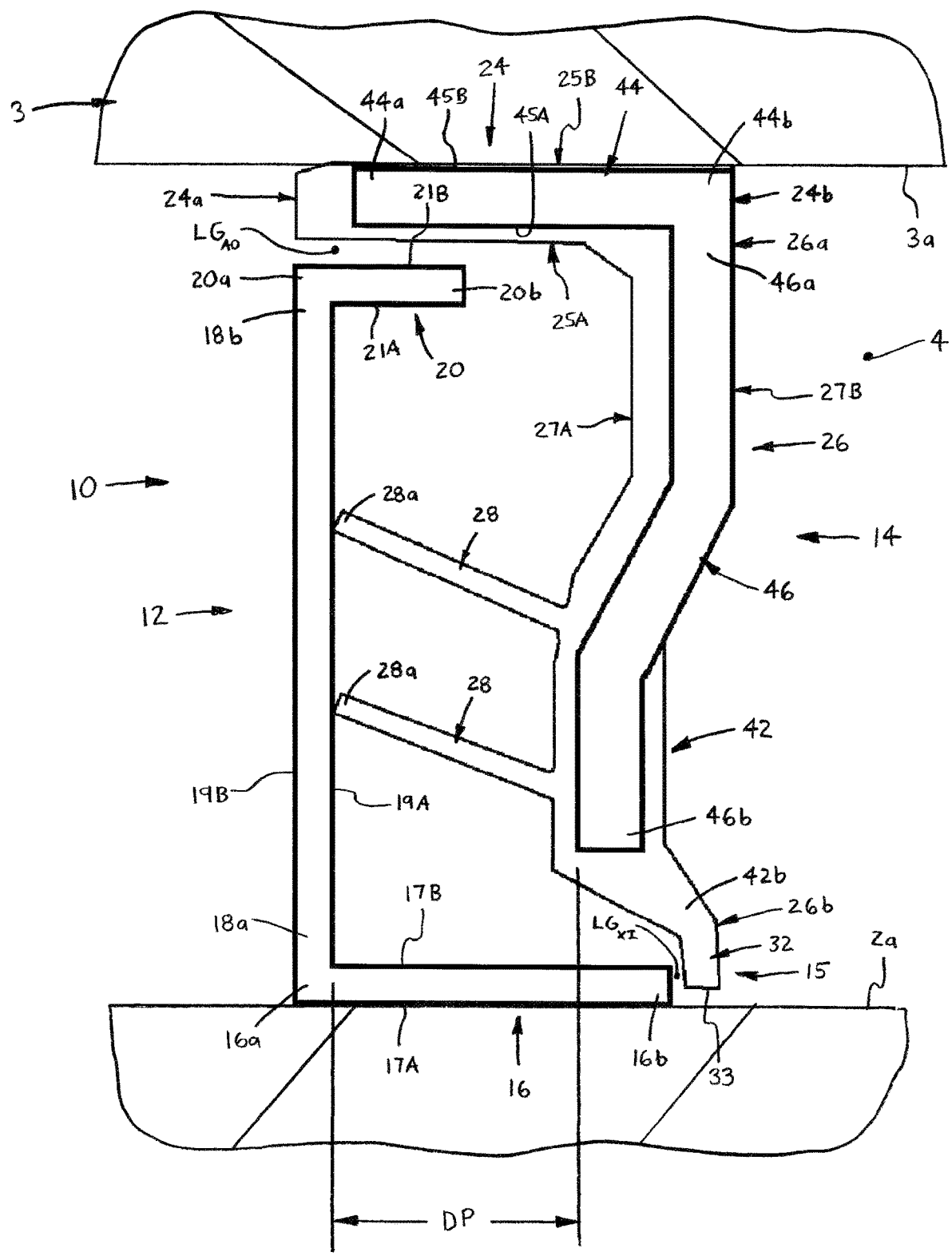
FIG. 6 is an enlarged, axial cross-sectional view of an upper portion of a second construction seal assembly shown installed in an in-use configuration.
Figure 7:
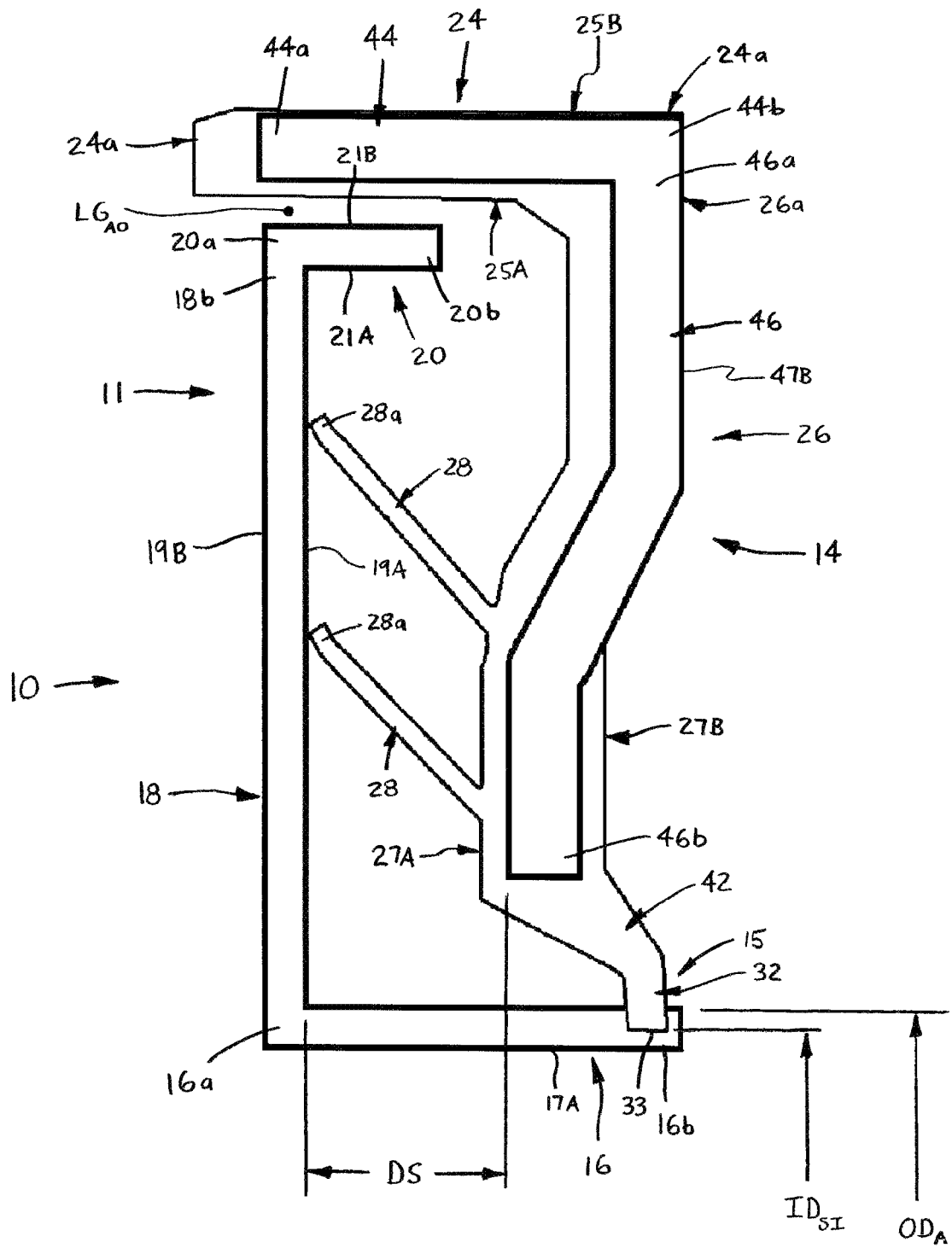
FIG. 7 is an enlarged, axial cross-sectional view of an upper portion of the second construction seal assembly shown as a coupled-together unit.
Figure 10:
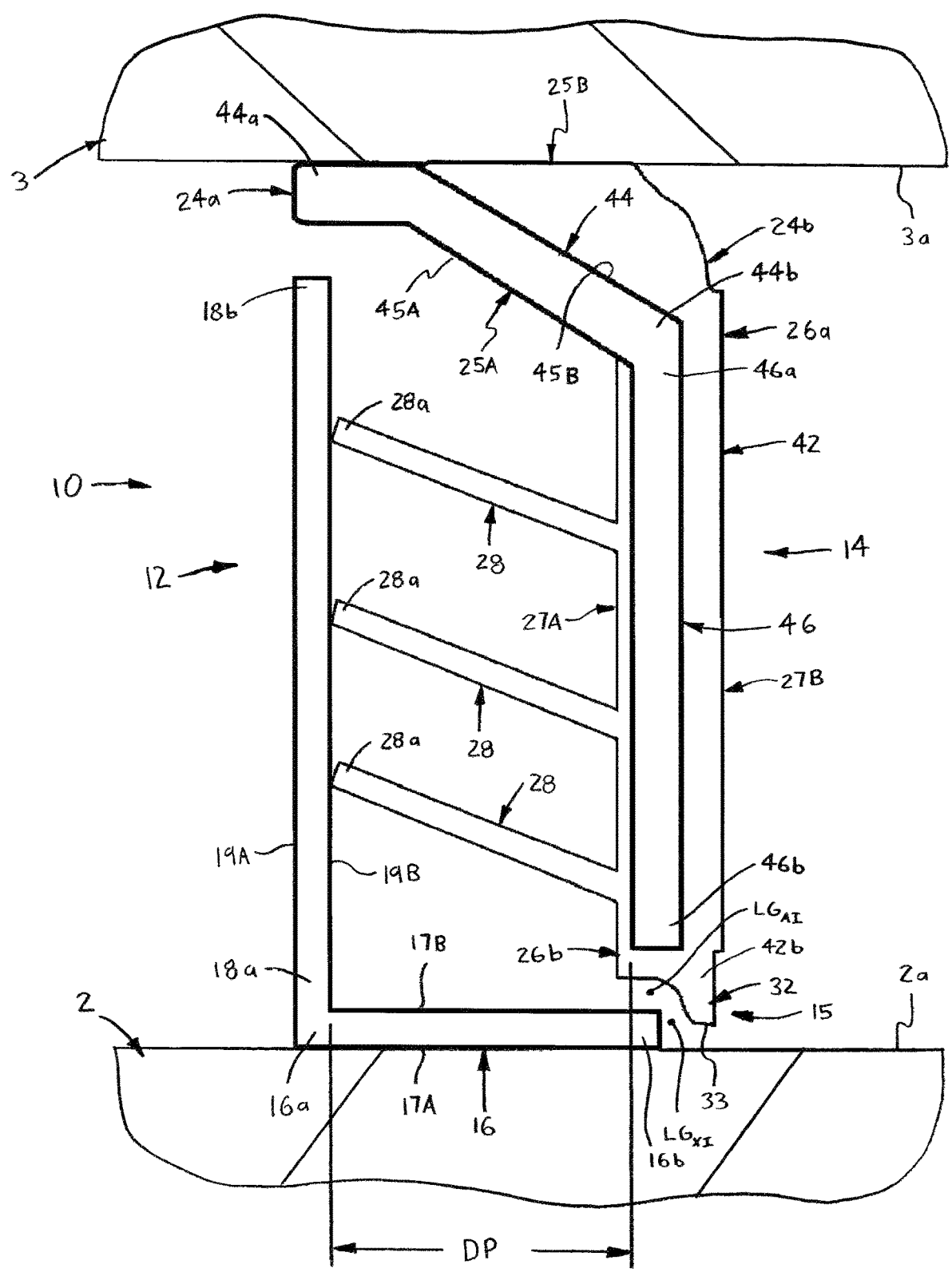
FIG. 10 is an enlarged, axial cross-sectional view of an upper portion of a third construction seal assembly shown installed in an in-use configuration.
Figure 11:
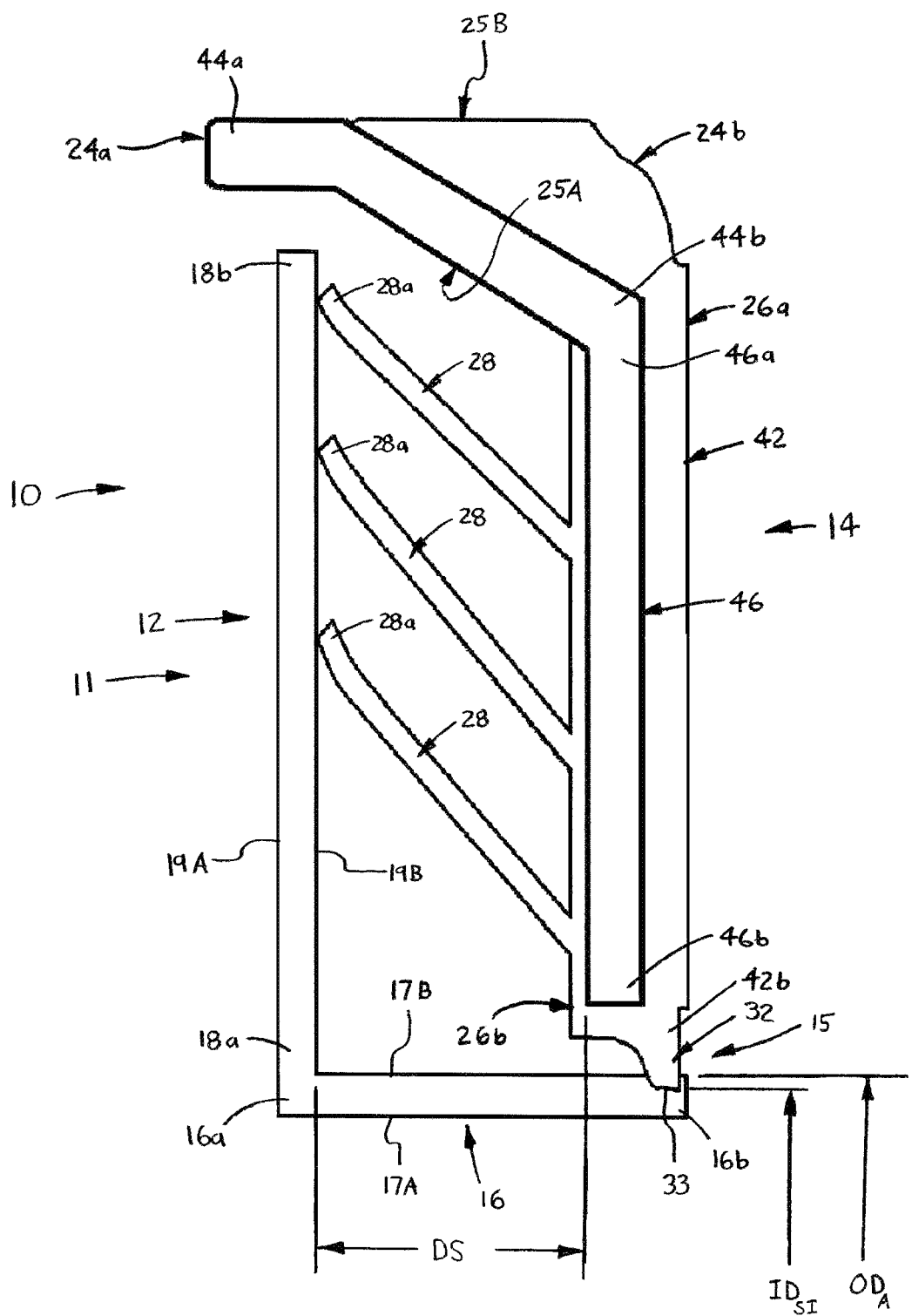
FIG. 11 is an enlarged, axial cross-sectional view of an upper portion of the third construction seal assembly shown as a coupled-together unit.

Further, the annular seal 14 has an axial portion 24 engageable with the outer member bore 3, a radial portion 26 extending radially inwardly from the axial portion 24 and at least one and preferably at least two axial sealing lips 28 engaged with the radial portion 18 of the shield 12. The seal axial portion 24 has first and second axial ends 24a, 24b, respectively, and inner and outer circumferential surfaces 25A, 25B, respectively, the outer surface 25B preferably being frictionally engageable with the outer member inner surface 3a to couple the seal 14 thereto. The seal radial portion 26 has outer and inner radial ends 26a, 26b, respectively, and opposing radial surfaces 27A, 27B, the outer end 26a being integrally formed with the axial portion second end 24b. During use of the seal assembly 10, the seal radial portion 26 is spaced from the shield radial portion 18 by at least a predetermined axial distance DP, as indicated in FIGS. 2, 6 and 10, so as to establish a desired contact pressure between the outer end 28a of each axial sealing lip 28 and the radial surface 19A of the shield radial portion 18, which establishes a "use configuration" of the seal assembly 10.

Furthermore, the at least one seal coupler section 15 is engageable with the radial portion 18 of the shield 12 or with the axial portion 16 of the shield 12 when an axial spacing distance DS between the seal radial portion 26 and the shield radial portion 18 is less than the predetermined distance DP, i.e., DS<DP. As such, the coupler section(s) 15 function to retain the shield 12 coupled with the seal 14 when the seal assembly 10 is separate from the outer member bore 4, and thus from the wheel bearing assembly 5, so as to form the coupled-together unit 11. Also, the seal 14 and the shield 12 are installable within the outer member bore 4 as the coupled-together unit 11, which is described below. Thereafter, the seal 14 is displaceable axially away from the shield 12, by means of an installation tool T3, so that the spacing distance DS between the shield radial portion 18 and the seal radial portion 26 is about equal to the desired, predetermined axial distance DP, as discussed in further detail below.

Figure 2:
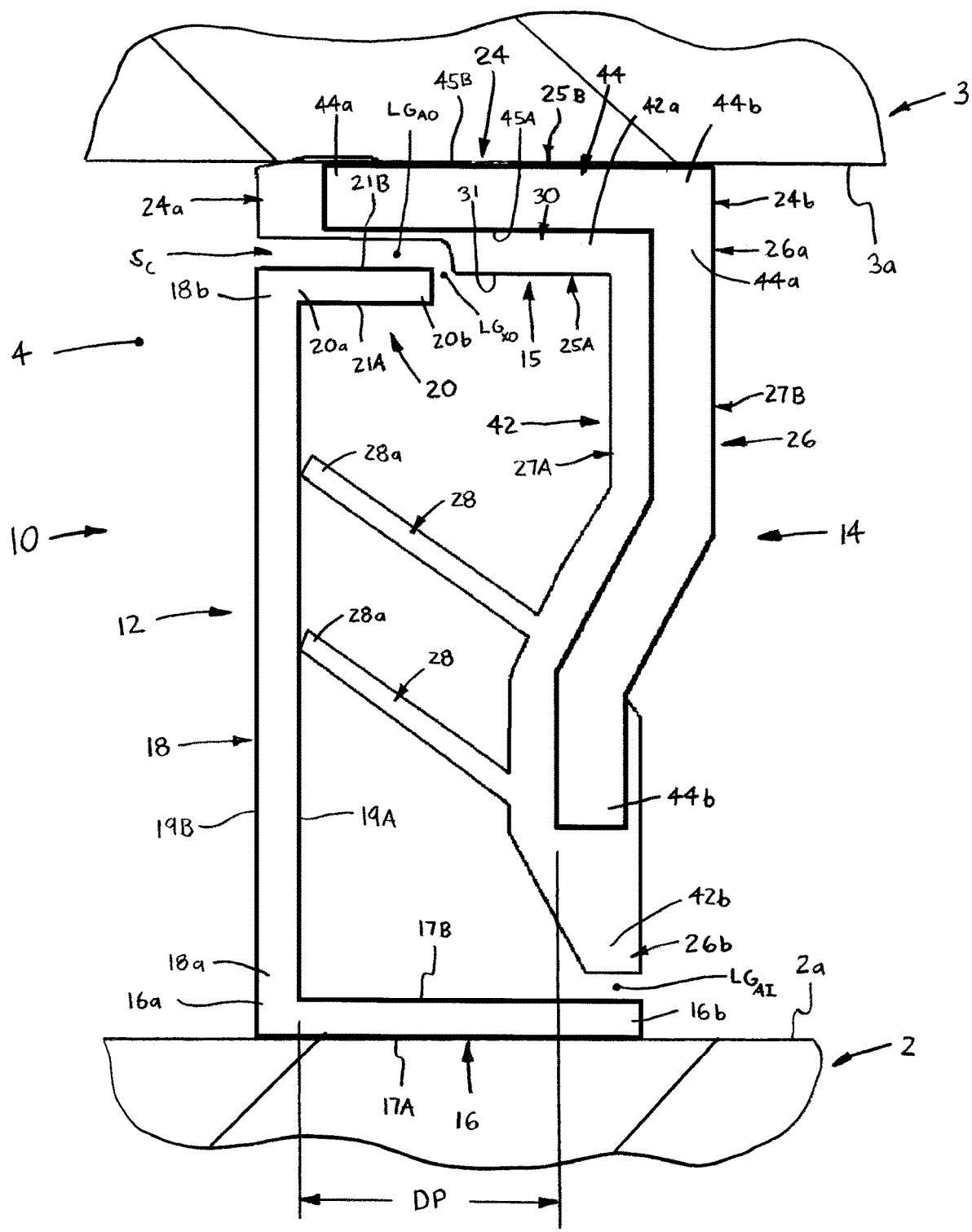
FIG. 2 is an enlarged, axial cross-sectional view of an upper portion of the first construction seal assembly shown installed in an in-use configuration.
Figure 3:
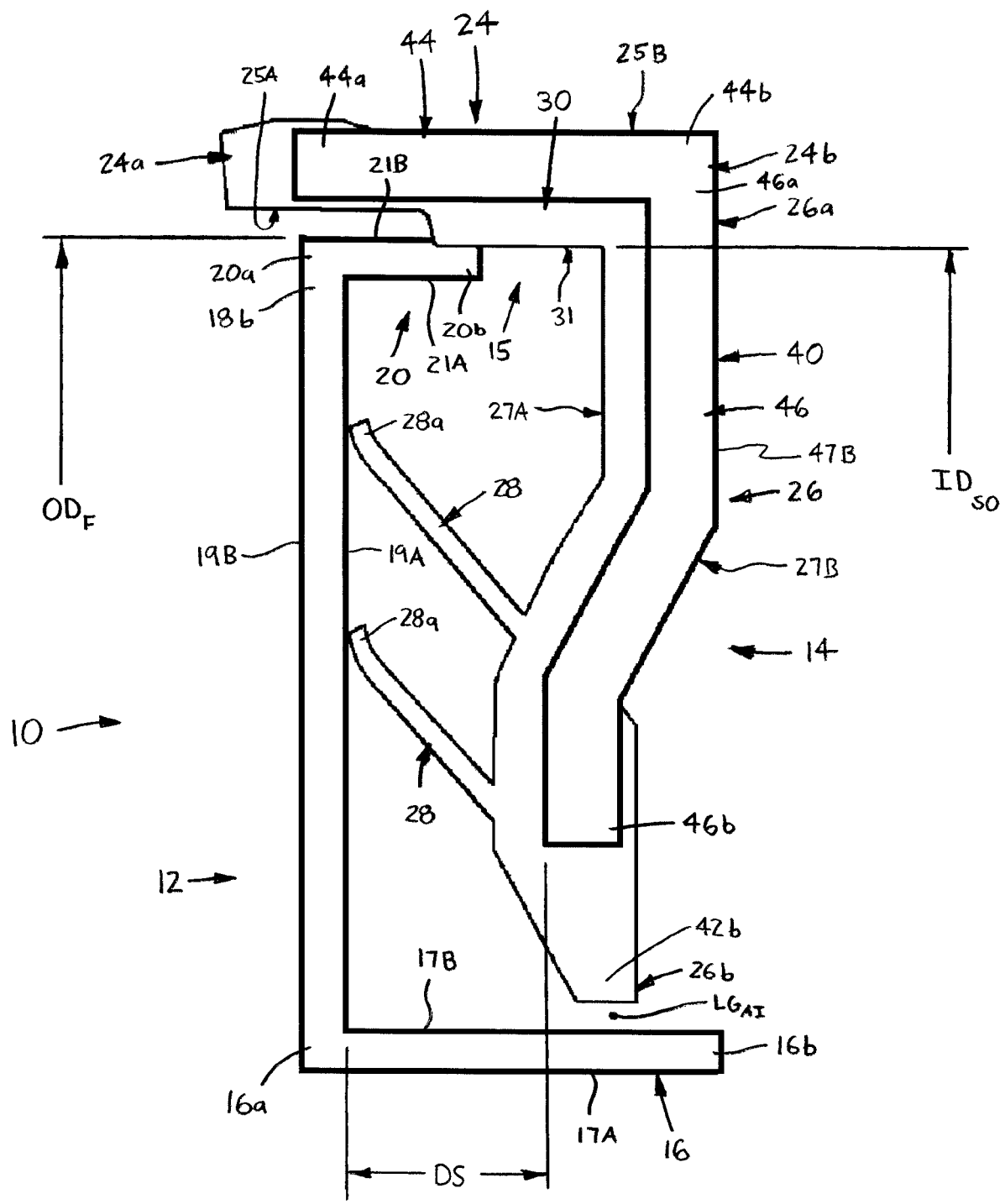
FIG. 3 is an enlarged, axial cross-sectional view of an upper portion of the first construction seal assembly shown as a coupled-together unit.

Referring to FIGS. 2, 3, 6, 7, 10 and 11, the at least one coupler section 15 of the seal 14 is preferably provided by a projection or shoulder 30 projecting radially inwardly from the seal axial portion 24 and engageable with the shield radial portion 18, as shown in FIGS. 2 and 3, or/and by a shoulder 32 projecting radially inwardly from the seal radial portion 28 and engageable with the shield axial portion 16, as depicted in FIGS. 6, 7, 10 and 11. More specifically, in a first construction depicted in FIGS. 1-5, the seal axial portion 24 includes a radially inwardly extending, outer shoulder 30 having an inner circumferential surface 31 with an inside diameter $ID_{SO}$ (FIG. 4). In this construction, the shield 12 includes the flange 20 with the outer circumferential surface 21B having an outside diameter $OD_F$ (FIG. 4) which is greater than the inside diameter $ID_{SO}$ of the shoulder inner circumferential surface $ID_{SO}$, i.e., $OD_F > ID_{SO}$. As such, the seal shoulder inner circumferential surface 31 is frictionally engaged with the shield flange outer circumferential surface 21B when the axial spacing distance DS is less than the predetermined distance DP so as to releasably couple the shield 12 and the seal 14.

In second and third constructions shown in FIGS. 6-13, the seal radial portion 26 includes a radially inwardly extending, inner shoulder 32 having an inner circumferential surface 33 with an inside diameter $ID_{SI}$. The outer circumferential surface 17B of the shield axial portion 16 has an outside diameter $OD_A$ greater than the inside diameter $ID_{SI}$ of the seal shoulder inner circumferential surface 33, i.e., $OD_A > ID_{SI}$. With this structure, the seal shoulder inner circumferential surface 33 is frictionally engaged with the shield axial portion outer circumferential surface 17B when the axial spacing distance DS is less than the predetermined distance DP to thereby releasably couple the shield 12 and the seal 14.

Referring to FIGS. 2-13, the seal 14 is preferably a composite formed of a rigid base 40 and an annular elastomeric body 42 molded to the base 40, although the seal 14 may alternatively be formed as a one-piece body fabricated of an elastomeric material or of any other appropriate material (no alternatives shown). Specifically, the annular rigid base 40 has L-shaped axial cross-sections and includes an axial section 44 providing part of the seal axial portion 24 and a radial section 46 extending radially inwardly from the axial section 44 and providing part of the seal radial portion 26. The rigid body axial section 44 has opposing first and second axial ends 44a, 44b, respectively, and inner and outer circumferential surfaces 45A, 45B and the rigid body radial section 46 has outer and inner radial ends 46a, 46b, respectively, and opposing radial surfaces 47A, 47B, the radial section outer end 46a being integrally formed with the axial section second end 44b. Also, the axial section 44 of the rigid base 40 may be substantially axial as depicted in FIGS. 2-8 or may include an axial segment and a frustoconical segment as shown in FIGS. 9-13.

Further, the elastomeric body 42 is disposed on the rigid base 40 and provides the one or more axial sealing lips 28 and the outer shoulder 30 or/and the inner shoulder 32. As such, each shoulder 30 or 32 is elastomeric and is either annular and extends entirely about the centerline $L_C$ (FIG. 1) or includes/is formed of a plurality of arcuate segments (not shown) spaced circumferentially about the centerline $L_C$. Specifically, in the first construction, the elastomeric body 42 includes the outer shoulder 30 extending radially inwardly from an axial section 42a of the elastomeric body 42 disposed on the inner circumferential surface 45A of the base axial section 44. The shoulder 30 is engageable with the shield radial portion 18, specifically the outer surface 21B of the flange 20, when the spacing distance DS is less than the predetermined spacing distance DP, as indicated in FIG. 3.

Preferably, the outer shoulder 30 is spaced axially from the first axial end 44a of the base axial section 44 such that an annular clearance space $S_C$ is defined between the first axial end 44a and the shoulder 30. With this structure, the radial outer end 18b of the shield radial portion 18 is disposed within the annular clearance space $S_C$ when the seal assembly 10 is in the "use configuration", i.e., the axial spacing distance DS is about equal to the predetermined axial distance DP as depicted in FIG. 2. Further, when the first construction seal assembly 10 is arranged in the use configuration, an outer annular labyrinth gap $LG_{AO}$ is defined between the shield flange 20 and the seal base axial section 44 and an outer axial labyrinth gap $LG_{XO}$ is defined between the axial end 20b of the shield flange 20 and the shoulder 30. Preferably, the elastomeric body 42 has an inner radial end 42b spaced radially outwardly from the shield axial portion 16 so as to define an inner annular labyrinth gap $LG_{AI}$.

Referring now to FIGS. 6-13, in second and third constructions, the elastomeric body 42 includes the inner shoulder 32 extending radially inwardly from a section 42b of the elastomeric body 42 disposed on the base radial section 46. The inner shoulder 32 is engageable with the shield axial portion 14, specifically with the radial portion outer circumferential surface 15B, when the spacing distance DS is less than the predetermined distance DP. Also, the shoulder 32 is spaced axially from the second axial end 16b of the shield axial portion 16 when the axial spacing distance DS is about equal to the predetermined axial distance DP. Further, when the seal assembly 10 is arranged in the use configuration, an inner axial labyrinth gap $LG_{XI}$ is formed between the shoulder 32 of the seal 16 and the second axial end 16b of the shield axial portion 16 and in the second construction, an outer annular labyrinth gap $LG_{AO}$ is defined between the shield flange 20 and the seal base axial section 44.

Figure 9:
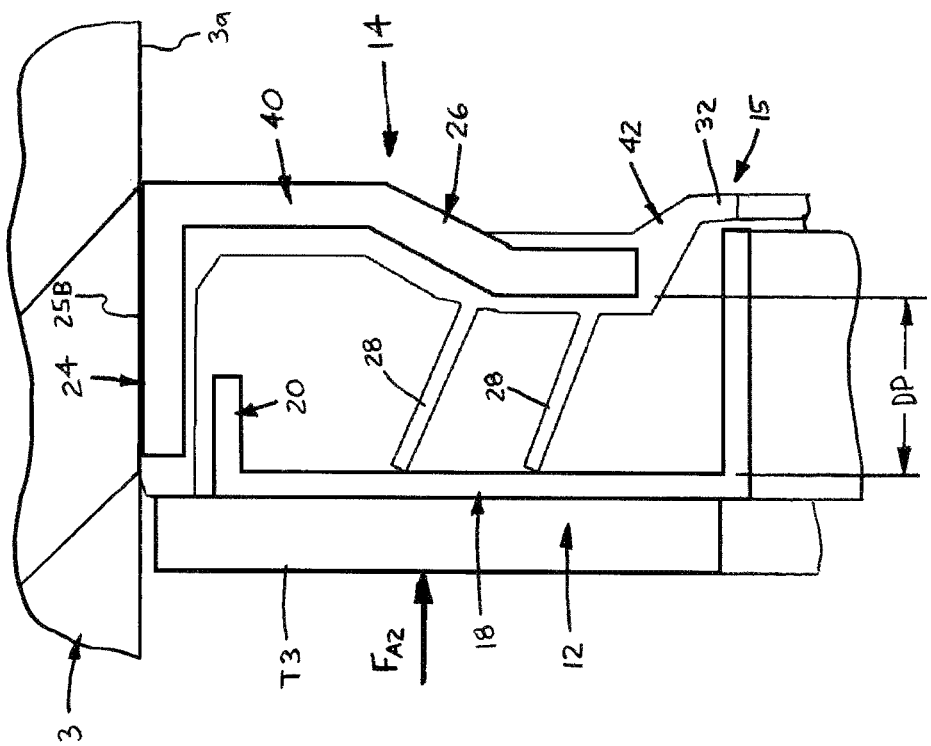
FIG. 9 is an axial cross-sectional view of an upper portion of the second construction seal assembly shown during a final installation step.
Figure 8:
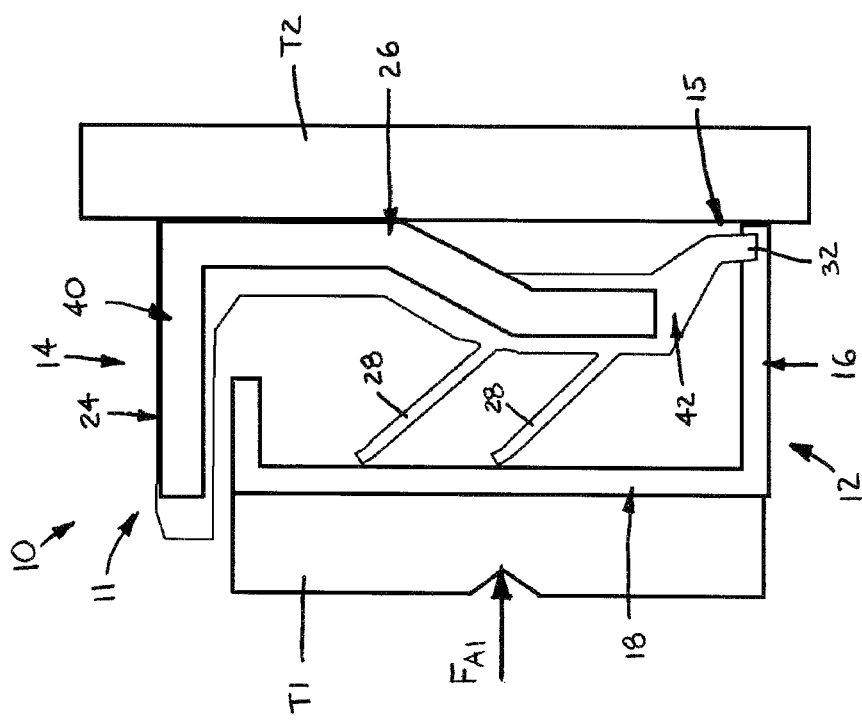
FIG. 8 is an axial cross-sectional view of an upper portion of the second construction seal assembly shown during a coupling process.
Figure 13:
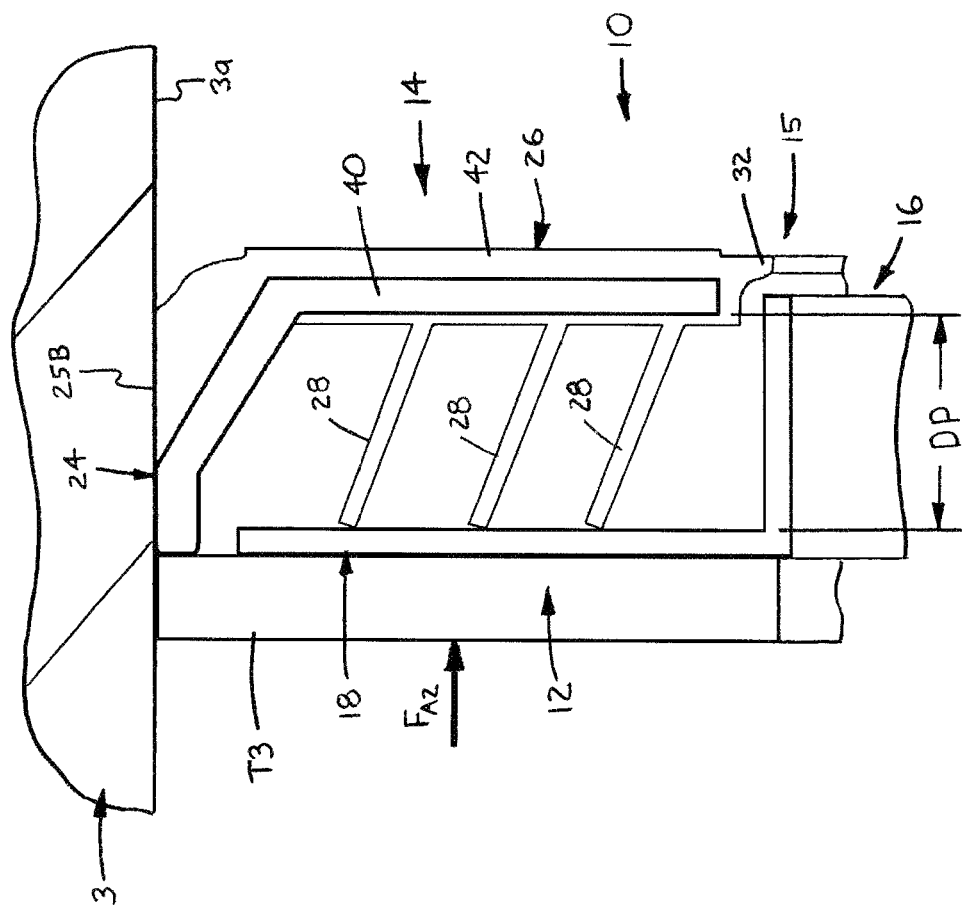
FIG. 13 is an axial cross-sectional view of an upper portion of the third construction seal assembly shown during a final installation step.
Figure 12:
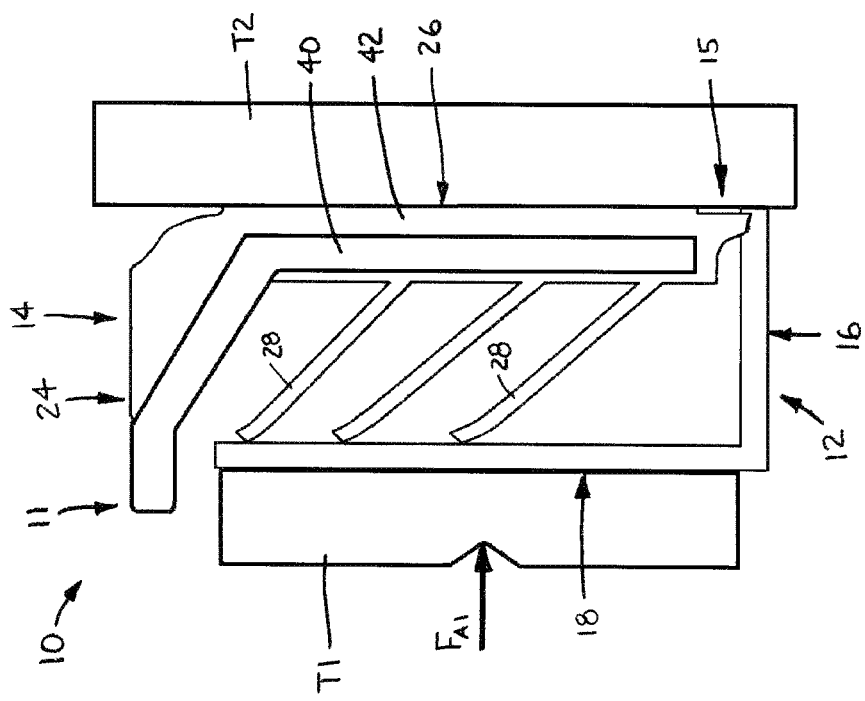
FIG. 12 is an axial cross-sectional view of an upper portion of the third construction seal assembly shown during a coupling process.

Referring to FIGS. 4, 5, 8, 9, 12 and 13, to couple the shield 12 and the seal 14, the two components 12, 14 are preferably disposed between a first tool T1 and a second tool T2, and then an axial force $F_{A1}$ is applied through the first tool T1 to the shield 12. The shield 12 is displaced axially toward the seal 14 so that the outer shoulder 30 engages with the shield flange 20 (FIG. 4) or/and the inner shoulder 32 engages with the shield axial portion 16 (FIGS. 8 and 12) and the shield and seal radial portions 18, 26 are spaced by a distance DS less than the predetermined distance DP, as shown in FIGS. 4, 8 and 12. Each coupled-together unit 11 may then be "transported", e.g., moved within a manufacturing facility for installation into an outer member/hub 3, shipped to a retailer or customer, etc., and then installed within a wheel bearing assembly 5 or within another appropriate application (e.g., a pump, an electric motor, a conveyor, a diagnostic machine, etc.). Preferably, each coupled-together unit 11 is then installed within the outer member 3 (i.e., wheel hub, pump housing, etc.) by first displacing the entire unit 11 axially into and partially within the bore 4, for example by means of the tool T1, until the shield 12 is located proximal to a desired installation position adjacent to a bearing. Thereafter, the seal 14 is displaced axially away from the shield 12 by means of a third tool T3 which engages only with the outer perimeter of the seal 14 (i.e., the seal axial portion 24) until the shield 12 and the seal 14 are spaced apart by the about the predetermined spacing distance DP, and preferably the first end 24a of the seal axial portion 24 is generally axially aligned or "flush" with the "outer" radial surface 19B of the shield radial portion 18, as shown in FIGS. 5, 9 and 13. The shaft 2 may then be inserted through the shield 12 to finalize the fabrication of the wheel bearing assembly 5 or other seal application. However, the seal assembly 10 may be installed within the wheel bearing assembly 5 or other application in any other appropriate manner, for example, by installing the coupled-together unit 11 about the shaft 2 and then within the outer member 3.

Although the three depicted exemplary constructions of the present invention each only have one coupler section 15, i.e., either the outer shoulder 30 or the inner shoulder 32, the seal assembly 10 may be formed with both inner and outer shoulders 30, 32 or with three or more shoulders/coupler sections (no alternatives shown). Further, the coupler section 15 may be formed in any other appropriate manner capable of releasably coupling the shield 12 and the seal 14, for example by providing a shoulder (not shown) on the shield 12 which is engageable with a portion of the seal 14, etc.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. An axial seal assembly for sealing a bearing, the bearing coupling an inner shaft and an outer member, the outer member having an inner circumferential surface defining a bore and the shaft being disposed within the bore, the seal assembly comprising:
- an inner annular shield having an axial portion disposable about the shaft at a position adjacent to the bearing and a radial portion extending radially outwardly from the axial portion; and
- an outer annular seal having an axial portion engageable with the outer member bore and a radial portion extending radially inwardly from the axial portion, the seal including at least one axial sealing lip engaged with the radial portion of the annular shield, the seal radial portion being spaced from the shield radial portion by at least a predetermined axial distance during use of the seal assembly, the seal having at least one coupler section engageable with the radial portion of the shield when an axial spacing distance between the seal radial portion and the shield radial portion is less than the predetermined axial distance so as to retain the shield coupled with the seal when the seal assembly is separate from the shaft and the outer member and the coupler section is spaced axially apart from the radial portion of the shield during use of the seal assembly.

2. The axial seal assembly as recited in claim 1 wherein the seal and the shield are installable within the outer member bore as a coupled-together unit and thereafter the seal is displaceable axially away from the shield so that the spacing distance between the shield radial portion and the seal radial portion is equal to the predetermined axial distance.

3. The axial seal assembly as recited in claim 1 wherein the at least one coupler section of the seal is provided by a shoulder projecting radially inwardly from the seal axial portion and engageable with the shield radial portion.

4. The axial seal assembly as recited in claim 1 wherein:
- the seal axial portion includes a radially inwardly extending shoulder having an inner circumferential surface with an inside diameter; and
- the shield radial portion includes a flange extending axially toward the seal radial portion, the flange having an outer circumferential surface with an outside diameter greater than the inside diameter of the inner circumferential surface of the seal shoulder along the entire shoulder inner circumferential surface such that the seal shoulder inner circumferential surface is frictionally engaged with the shield flange outer circumferential surface when the axial spacing distance is less than the predetermined distance and is axially spaced from the shield flange outer circumferential surface during use of the seal assembly.

5. The axial seal assembly as recited in claim 1 wherein the seal includes:
- an annular rigid base with an axial section providing part of the seal axial portion and a radial section extending radially inwardly from the axial section and providing part of the seal radial portion; and
- an annular elastomeric body disposed on the rigid base and providing the at least one axial sealing lip, the elastomeric body including a shoulder extending radially inwardly from the base axial section and engageable with the shield radial portion.

6. The axial seal assembly as recited in claim 5 wherein:
- the axial section of the seal rigid base has first and second axial ends and an inner circumferential surface, the at least one annular shoulder extending radially inwardly from a section of the elastomeric body disposed on the inner circumferential surface of the base axial section and is spaced axially from the first axial end of the base axial section toward the second axial end of the base axial section such that an annular clearance space is defined between the first axial end and the shoulder; and
- a radial outer end of the shield radial portion is disposed within the annular clearance space when the axial spacing distance between the shield radial portion and the seal radial portion is equal to the predetermined axial distance.

7. The axial seal assembly as recited in claim 6 wherein:
- the shield radial portion includes a flange extending axially toward the seal radial portion and having an axial end, an annular labyrinth gap is defined between the shield flange and the seal base axial section and an axial labyrinth gap is defined between the axial end of the shield flange and the at least one shoulder; and
- the seal elastomeric body has an inner radial end spaced radially outwardly from the shield axial portion so as to define an annular labyrinth gap.

8. The axial seal assembly as recited in claim 5 wherein the seal has a centerline and the at least one shoulder is annular and extends circumferentially and entirely about the centerline.

9. An axial seal assembly for sealing a bearing, the bearing coupling an inner shaft and an outer member, the outer member having an inner circumferential surface defining a bore and the shaft being disposed within the bore, the seal assembly comprising:
- an inner annular shield having an axial portion disposable about the shaft at a position adjacent to the bearing and a radial portion extending radially outwardly from the axial portion; and
- an outer annular seal having an axial portion engageable with the outer member bore and a radial portion extending radially inwardly from the axial portion, the seal including at least one axial sealing lip engaged with the radial portion of the annular shield, the seal radial portion being spaced from the shield radial portion by at least a predetermined axial distance during use of the seal assembly, the seal having an outer shoulder engageable with the radial portion of the shield when an axial spacing distance between the seal radial portion and the shield radial portion is less than the predetermined distance so as to retain the shield coupled with the seal when the seal assembly is separate from the shaft and the outer member and the outer shoulder is spaced axially apart from the radial portion of the shield during use of the seal assembly.

10. The axial seal assembly as recited in claim 9 wherein the seal and the shield are installable within the outer member bore as a coupled-together unit and thereafter the seal is displaceable axially from the shield so that the spacing distance between the shield radial portion and the seal radial portion is equal to the predetermined axial distance.

11. The axial seal assembly as recited in claim 9 wherein the outer shoulder projects radially inwardly from the seal radial portion.

12. The axial seal assembly as recited in claim 9 wherein:
- the outer shoulder extends radially inwardly from the seal axial portion and has an inner circumferential surface with an inside diameter; and
- the shield radial portion includes a flange extending axially toward the seal radial portion, the flange having an outer circumferential surface with an outside diameter greater than the inside diameter of the inner circumferential surface of the seal outer shoulder along the entire shoulder inner circumferential surface such that the seal shoulder inner circumferential surface is frictionally engaged with the shield flange outer circumferential surface when the axial spacing distance is less than the predetermined distance and is axially spaced from the shield flange outer circumferential surface during use of the seal assembly.

13. The axial seal assembly as recited in claim 9 wherein the seal includes:
    an annular rigid base with an axial section providing part of the seal axial portion and a radial section extending radially inwardly from the axial section and providing part of the seal radial portion; and
    an annular elastomeric body disposed on the rigid base and providing the at least one axial sealing lip, the elastomeric body including at least one of a shoulder extending radially inwardly from the base axial section and engageable with the shield radial portion and a shoulder extending radially inwardly from the base radial section and engageable with the shield axial portion.

14. The axial seal assembly as recited in claim 13 wherein:
    the axial section of the seal rigid base has first and second axial ends and an inner circumferential surface, the outer shoulder extending radially inwardly from a section of the elastomeric body disposed on the inner circumferential surface of the base axial section and is spaced axially from the first axial end of the base axial section toward the second axial end of the base axial section such that an annular clearance space is defined between the first axial end and the shoulder; and
    a radial outer end of the shield radial portion is disposed within the annular clearance space when the axial spacing distance between the shield radial portion and the seal radial portion is equal to the predetermined axial distance.

* * * * *